Patented Oct. 9, 1951

2,570,297

UNITED STATES PATENT OFFICE 2,570,297

AMINO ACID SYNTHESIS

David I. Weisblat and Douglas A. Lyttle, Kalamazoo, Mich., assignors to The Upjohn Company, Kalamazoo, Mich., a corporation of Michigan No Drawing. Application November 29, 1946, Serial No. 713,094

3 Claims. (Cl. 260—534)

The present invention relates to the preparation of amino acids and is more particularly concerned with a novel method for the synthesis of alpha amino acids.

The significance of the alpha amino acids in human and animal nutrition makes their synthesis generally of great importance. The voluminous literature and the great number of attempts to find suitable procedures for the preparation of alpha primary amino acids is indicative of this importance. (Gilman, Organic Chemistry, vol. II, "Natural amino acids," by H. T. Clark, pp. 1079–1166, John Wiley and Sons, New York, 1943; Schmidt, "The Chemistry of Amino Acids and Proteins," chapter II, "The Constitution and synthesis of amino acids" by Max S. Dunn, Charles C. Thomas, Baltimore, 1938; Vickery and Schmidt, Chem. Rev. 9, 169–318 (1931)). The principal methods which previously have been employed for the preparation of amino acids involve: 1. The cyanohydrin synthesis (Strecker synthesis). 2. The action of ammonia on alpha halogen acids. 3. Reactions using malonic esters (a) to give alpha halogen acids for method (2), (b) reaction of phthalamidomalonic ester with halogen compounds, (c) reactions of amino malonic esters, (d) reaction of potassium ethylmalonates with hydrazine. 4. Condensation of aldehydes with (a) hydantoin, (b) diketopiperazine, (c) hippuric acid (azlactone method). 5. From alpha keto acids by (a) reduction and amination, (b) reduction of oximes, (c) reduction of hydrazones.

Detailed procedures for the production of alpha amino acids usually involve, in some stage of the synthesis, one of these general methods. The preparation of tryptophane from gramine (Albertson et al., J. Am. Chem. Soc. 66, 500 (1944), 67, 36–7 (1945); Snyder et al., J. Am. Chem. Soc. 66, 350 (1944); Howe et al., J. Am. Chem. Soc. 67, 38 (1945)) may be considered as a variant of method 3 (b). The preparation of methionine (Windus and Marvel, J. Am. Chem. Soc. 52, 2575 (1930); Barger and Weichselbaum in Blatt Org. Synthesis, col vol. II, 384, John Wiley and Sons, New York, (1943) proceeds through malonic ester or phthalimidomalonic ester by procedures 3 (a) and 3 (b). Ornithine, necessary for the preparation of arginine, has been prepared by method 3 (b) (Fischer, Ber. 34, 454 (1901)), as the dipicrate from $CH_2=CH-CH=CH-COOH$ (beta vinylacrylic acid) and ammonia (Fischer and Raske, Ber. 38, 3607 (1905)), and as the dibenzoyl derivative, by Kumatsu and Sugasawa, following an eleven step procedure from acrolein (J. Pharm. Soc., Japan, 48, 24 (1929); Chem Abstr. 28, 1758 (1928)). Because of the difficulty of synthesis, the preferred method of obtaining this amino acid is by the hydrolysis of gelatin (Blatt Organic Syntheses, col. vol. II, 59–62, John Wiley and Sons, New York, 1943). Histidine has been prepared by procedures 2, 3 (a) and 4 (c). Valine (Organic Syntheses 20, 106 (1940)), leucine, and isoleucine are best prepared by methods 1 and 3 (a). Phenylalanine has been prepared by methods 3 (b), 4 (b) and 4 (c). (Blatt Org. Syn., col. vol. II, 489–94, John Wiley and Sons, New York, 1943.) Threonine has been prepared by a procedure under method 2 (Org. Syn. 20, 101, John Wiley and Sons, New York, 1940), the necessary halogen acid being obtained from crotonic acid.

Other amino acids which are not considered as essential to certain animal diets have been prepared by variations of these methods. They are aspartic acid, glutamic acid, hydroxyglutamic acid, glycine, alanine, norleucine, serine, cysteine and tyrosine.

Inasmuch as the amino acids appear to play an increasingly important role in the nutrition and physiology of the human race, the importance thereof, as well as the importance of a new and more practicable synthesis therefor, is considered obvious.

It is an object of the present invention to provide a new method for the synthesis of amino acids. An additional object of the invention is the provision of a method for the synthesis of amino acids in a manner which may be conducted with increased facility in comparison with known methods. A further object of the invention is the provision of a novel method for the synthesis of amino acids which will be more economically and commercially practicable. Another object of the invention is the provision of a novel method for the production of amino acids which involves the alkylation of an ester of nitroacetic acid. A further object of the invention is the provision of a process for the preparation of amino acids which includes the step of reducing an alpha nitro acid or an ester thereof. Another object of the invention is the provision of a method for the synthesis of amino acids which proceeds through nitro acids or nitro acid esters corresponding to the desired amino acid. A further object of the invention is the provision of a novel method for the synthesis of amino acids which may be conducted in three steps from the starting nitroacetate, or with various combinations of steps when starting with an intermediate. Another object of the invention is the provision of a method for the preparation of amino acids which proceeds through the steps of alkylation, reduction, hydrolysis and, if desired, resolution. Another object of the invention is the provision of a process which involves the alkylation of an ester of nitroacetic acid, reduction and hydrolysis of the resulting nitro acid ester to the amino acid. Another object of the invention is the provision of a process for the preparation of optical isomers of amino acids in substantially pure form. A still further object of the invention is the provision of novel compounds, intermediates in the preparation of amino acids, including esters of nitro acids, the nitro acids themselves, and, in some cases, the esters of the amino acids. Other objects of the invention will be apparent from the following specification and claims.

The method of our invention is generally applicable to the preparation of the above-named and other primary alpha amino acids. The method of our invention essentially involves the treatment of an ester of nitroacetic acid, e. g., ethyl nitroacetate, with a selected "alkylating agent," i. e., an agent of the alkylating type which is capable of introducing a desired group into the acid portion of the nitroacetate molecule at the alpha carbon atom, reduction of the nitro ester thus formed, isolation of the amino ester and separation of the same into its optical enantiomorphs if desired, and hydrolysis of the amino ester to the particular amino acid concerned.

The alkylation step of our new synthesis may be carried out by reacting together any desired ester of nitroacetic acid, or salts thereof, and a selected "alkylating agent." By "alkylating agent," as herein employed, is intended any agent comprising at least a selected group, and capable of introducing said group into the acid portion of the nitroacetate molecule at the alpha carbon atom. As agents in this capacity may be mentioned:

1A. Alkyl halides, alkyl arylsulfonates, and alkyl sulfates with a basic catalysis;
B. Carbinols with boron trifluoride catalysis;
C. Substituted dialkylamines (tertiary amines), or quaternary ammonium compounds with or without alkali and/or heat;
2. Aldehydes or ketones with acidic, basic, or neutral catalysis according to Knoevenagel type of condensation.
3A. Compounds containing activated double bonds;
B. Compounds containing epoxide or thioepoxide systems.

It will be noted that the esters of nitroacetic acid, $NO_2-CH_2-COOR$, may now be considered as being related to malonic and cyanacetic esters, $ROOC-CH_2-COOR$ and $NC-CH_2-COOR$, respectively, in that all of the esters have a negative substituent on the carbon atom alpha to the esterified carboxyl group and for this reason exhibit the same general type of reactivity. Thus the alkylation of the nitroacetic acid ester may be carried out in a manner somewhat similar to the alkylation of malonic or cyanacetic esters and likewise somewhat similar to the alkylations of nitroparaffins, for example, with the employment of such types of compounds as mentioned in the foregoing paragraph. Any suitable agent may be employed for the alkylation of the nitroacetates, provided, of course, that the desired substituted nitroacetate be produced by the alkylation reaction, but the above-mentioned types of compounds have been found especially satisfactory, and their employment in the alkylation step therefore constitutes a preferred embodiment of the invention.

The alkylation step of our new synthesis may, for example, be carried out by reacting together an ester of nitroacetic acid, e. g., ethyl nitroacetate, and a suitable alkylating agent, for example, one such as is utilised in the preparation of tryptophane, gramine (3 - dimethylaminomethylindole), with or without the employment of alkali and heat. We have found that when the process is conducted in this manner, e. g., with the employment of a nitroacetate and a substituted dialkylamine such as gramine, it is usually advantageously, although not necessarily, carried out in an anhydrous organic solvent such as xylene, while passing a slow stream of nitrogen through the reaction with vigorous agitation, at a temperature usually up to about 100 degrees centigrade over a period of five hours, more or less. During this period of heating, a considerable quantity of dialkylamine (dimethylamine from gramine) is evolved. The hot solution may then be filtered from a small amount of crystalline solid which usually forms and the xylene removed by concentration in vacuo. The residual gum may be dissolved in chloroform, the solution extracted with dilute hydrochloric acid and washed with water until neutral. The remaining solution may be dried, concentrated in a vacuum, freed of excess nitroacetate by distillation under reduced pressure, dissolved in chloroform or similar solvent, and extracted to exhaustion with dilute alkali. After acidification and extraction with chloroform or similar solvent, drying and concentrating the last chloroform extract usually leaves an oil which may be crystallised readily. This oil is an ester of the desired substituted nitroacetic acid, in the case of the foregoing example wherein gramine and ethyl nitroacetate were reacted, of alpha-nitro-beta-(3-indole)propionic acid, in a substantially pure form. Other methods may be employed to separate the ester and will be apparent to one skilled in the art.

The above alkylation of a nitroacetic acid ester with a substituted dialkylamine is exemplary of the type of alkylation hereinafter described as type 1. The type of alkylation hereinafter described as type 2 is effected by the use of an aldehyde or ketone with an acidic, basic, or neutral catalysis, and is usually, although not necessarily, conducted at a relatively low temperature, in the presence of a catalyst such as piperidine or para-toluenesulfonic acid. Either an alkylidene nitro ester or a hydroxy-containing nitro ester is the first product of the reaction, and if it is not desired to produce an amino acid containing a hydroxyl group on the beta carbon atom, such may usually be expelled from the molecule by gentle heating. Type 2 condensations are generally carried out according to known considerations for a Knoevenagel type of reaction. This condensation type is further illustrated by Example 7 and by the illustrative reactions outlined herein. Type 3 alkylations, in which the alkylating agent contains either an activated double bond, an epoxide system, or a thioepoxide system, is usually carried out in the presence of a metal alkoxide, such as sodium ethoxide, or other similar catalyst.

The nitroacetate or nitroacetate salt employed in the process may also be varied widely, and representative esters are the methyl, ethyl, propyl, isopropyl, butyl, amyl, n-hexyl, octyl, caproyl, stearyl, cyclohexyl, benzyl, et cetera. Any ester or salt of an ester of the formula $$NO_2-CH_2-COOR$$

wherein R is a hydrocarbon radical, is used in the alkylation and, as in the following illustrative examples, a particular nitroacetate is employed merely as a matter of convenience.

The reduction of a selected nitro ester may also be conducted in any suitable manner. For example, in the preparation of tryptophane, we may place ethyl alpha-nitro-beta-(3-indole)propionate, a small amount of organic solvent, such as absolute ethanol or butanol, and a quantity of a Raney nickel catalyst in an autoclave under an original hydrogen pressure of 1500 p. s. i. at about 25 degrees centigrade and raise the temperature to about 100 degrees centigrade until the theoretical amount of hydrogen is absorbed. Other hydrogenation catalysts, such as Adam's catalyst, $PtO_2$, platinum, or palladium, may also be employed, and the apparatus and exact method of conducting the hydrogenation reaction is of concern only in that the nitro group of the nitro ester be reduced to the amino group by the procedure.

Likewise, if it is desired to conduct the reduction and hydrolysis steps in a single operation, this too may be done.

After the hydrogenation reaction, the catalyst may be removed by filtration, the remaining liquid concentrated under vacuum, treated with dilute sodium hydroxide solution, decolorised with activated charcoal, filtered, and adjusted to the desired pH with glacial acetic acid, whereafter the desired amino acid usually crystallises from solution. Other conventional methods may be used to concentrate and crystallise the amino acid from the reaction product of the hydrogenation, and methods known in the prior art will be found satisfactory for this purpose. Upon further treatment with an additional amount of activated charcoal, filtration, and several recrystallisations, amino acid crystals of exceptional purity may in some instances be obtained. The reduction may also be carried out chemically with the employment of iron, iron filings, tin, zinc and concentrated hydrochloric acid, or with $(NH_4)_2S$, as well as other chemical reducing agents, or in any other manner to reduce the nitro group to the amino group and to allow production of the desired alpha amino acid.

The method of our invention, in its broader sense, contemplates the preparation of all the naturally occurring and other primary alpha amino acids as indicated by the following illustrations, the acids produced, of course, being in each case of the dl form:

Reactions of Type 2 may be illustrated as follows:

I. For isoleucine—

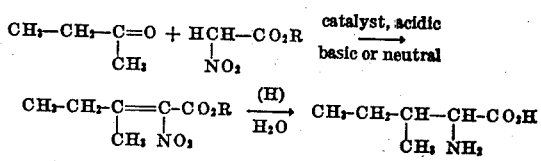

II. For valine—

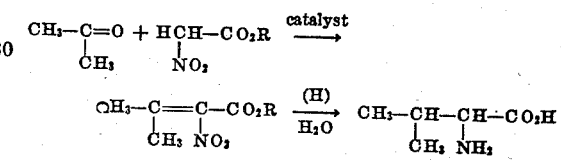

III. For phenylalanine—

(a)

(b)

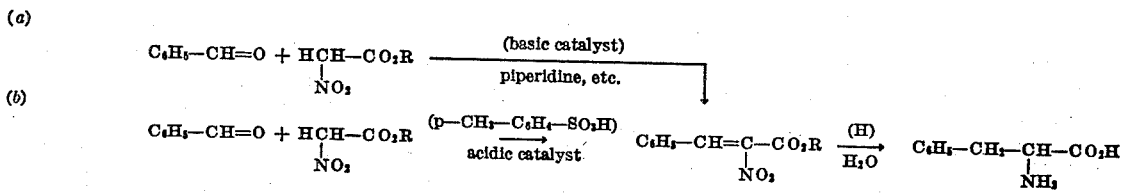

IV. For threonine—

(a)

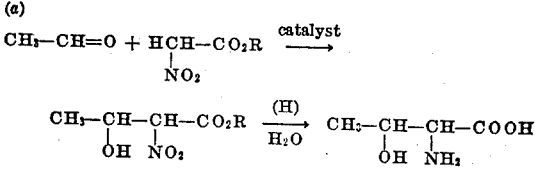

(b)

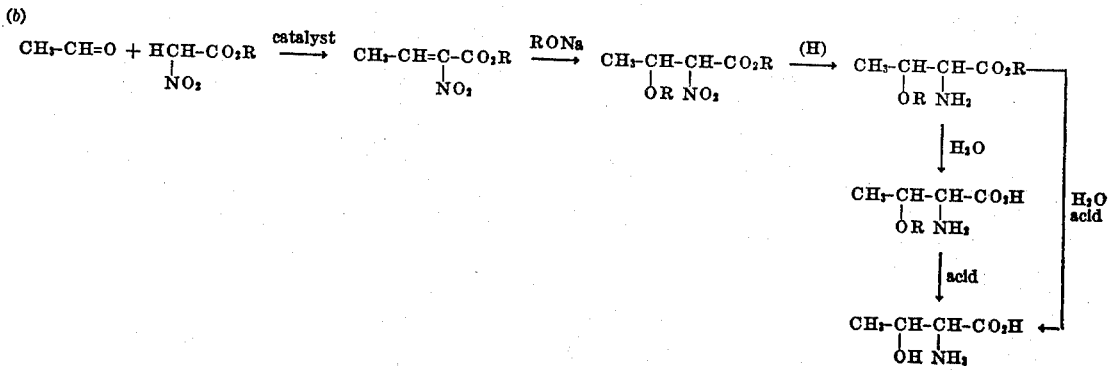

V. For norleucine—

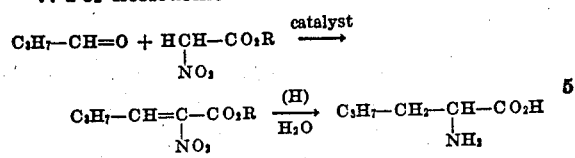

VI. For hydroxyglutamic acid—

(a)

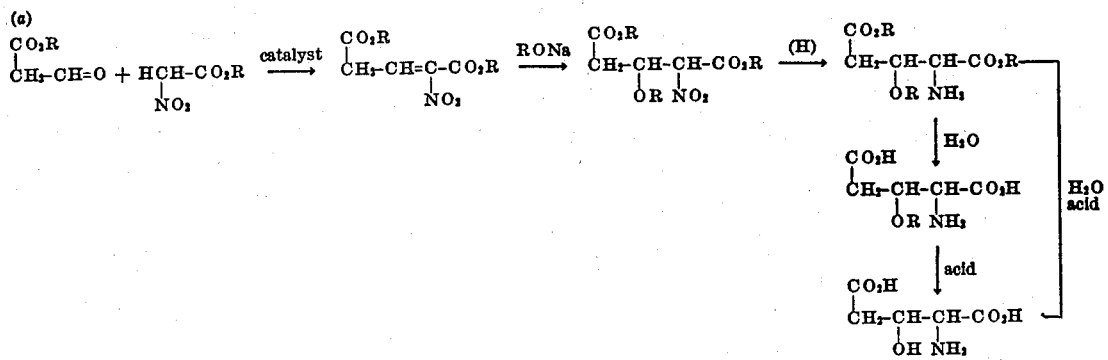

(b)

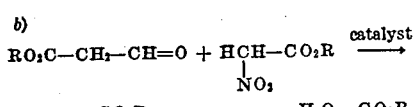

VII. For tyrosine—

(a)

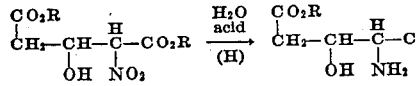

(b)

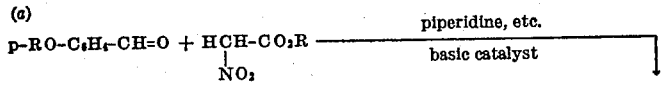

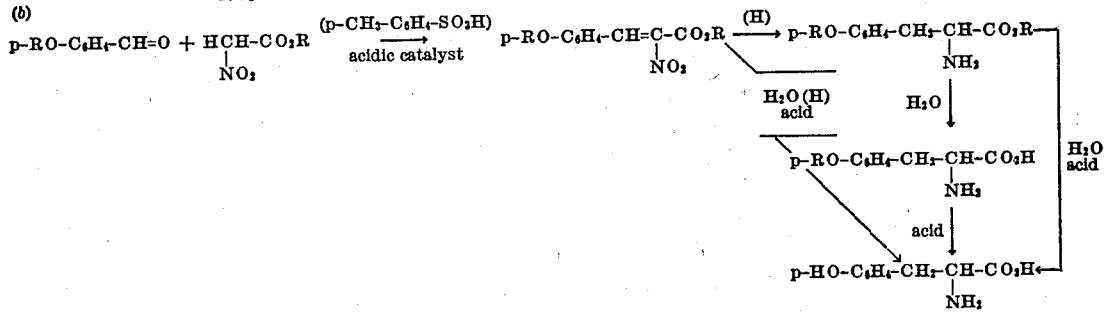

VIII. For serine—

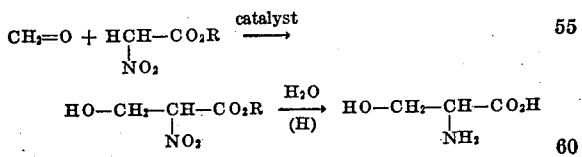

In the above illustrative examples of type 2 alkylation as applied in the preparation of several alpha amino acids from an ester of nitroacetic acid, R indicates a hydrocarbon radical, preferably an alkyl radical. Catalysts employed for the condensation step may be either acid, neutral, or basic, and as representative catalysts are mentioned para-toluenesulfonic acid and piperidine, although numerous others may be employed with equal facility. The radical desired to be introduced into the nitroacetate molecule must, as will be noted, have either an aldehyde or ketone group present in the molecule in order to undergo the Knoevenagel type of condensation.

The nitro acid and nitro acid ester intermediates of the amino acids are indicated schematically by the following:

Valine (alpha-amino-beta-methylbutyric acid)—
    Intermediates:
        Alpha-nitro-beta-methylbutyric acid and esters thereof.
        Alpha-amino-beta-methyl-butene-2-oic acid and esters thereof.
        Alpha-amino-beta-hydroxy-beta-methylbutyric acid and esters thereof.

Leucine (alpha-amino-gamma-methylvaleric acid)—
    Intermediates:
        Alpha-nitro-gamma-methylvaleric acid and esters thereof.
        Alpha-nitro-gamma-methyl-pentene-2-oic acid and esters thereof.
        Alpha-nitro-beta-hydroxyisocaproic acid and esters thereof (Example 7 hereinafter).

Isoleucine (alpha-amino-beta-methylvaleric acid)—
    Intermediates:
        Alpha-nitro-beta-methylvaleric acid and esters thereof.
        Alpha-nitro-beta-methyl-pentene-2-oic acid and esters thereof.
        Alpha-nitro-beta-hydroxy-beta-methylvaleric and acid and esters thereof.

Serine (alpha-amino-beta-hydroxypropionic acid)—
    Intermediates:
        Alpha-nitro-beta-hydroxypropionic acid and esters thereof.
        Alpha-nitro-beta-alkoxypropionic acids and esters thereof.

Threonine (alpha-amino-beta-hydroxy-n-butyric acid)—
   Intermediates:
      Alpha-nitro-beta - hydroxy - n - butyric acid and esters thereof.
      Alpha-nitro-beta-alkoxy-n-butyric acids and esters thereof.
      Alpha-nitro-beta-hydroxy-n-butene - 2-oic acid and esters thereof.
      Alpha-nitro-beta-alkoxy-n - butene - 2-oic acid and esters thereof.

Norleucine (alpha-amino-caproic acid)—
   Intermediates: Alpha-nitro-caproic acid and esters thereof.
      Alpha-nitro-hexene-2-oic acid and esters thereof.
      Alpha-nitro-beta-hydroxycaproic acid and esters thereof.

Hydroxyglutamic acid (alpha-amino-beta-hydroxyglutaric acid)—
   Intermediates: Alpha-nitro-beta-hydroxyglutaric acid and esters thereof.
      Alpha-nitro-beta-alkoxyglutaric acids and esters thereof.

Phenylalanine (alpha-amino-beta-phenylpropionic acid)—
   Intermediates: Alpha-nitro-beta-phenylpropionic acid and esters thereof.
      Alpha - nitro - beta - phenyl - propene-2-oic acid and esters thereof.
      Alpha - nitro - beta - hydroxy - beta-phenylpropionic acid and esters thereof.

Tyrosine (alpha-amino-beta-para-hydroxyphenyl propionic acid)—
   Intermediates: Alpha-nitro-beta-para-hydroxyphenylpropionic acid and esters thereof.
      Alpha - nitro - beta - para - alkoxyphenylpropionic acids and esters thereof.
      Alpha - nitro - beta - para - hydroxyphenylpropene-2-oic acid and esters thereof.
      Alpha - nitro - beta - para - alkoxyphenylpropene-2-oic acids and esters thereof.

In addition to the above intermediates, the nitro acids and esters thereof, there is also formed in the preparation of any amino acid by our new synthesis an ester of the desired amino acid. These esters, and their formulae, will be at once apparent from an inspection of the various reactions outlined hereinbefore.

The following detailed examples illustrate further the manner in which the principle of our invention may be applied, but are not to be construed as limiting.

*Example 1.—Esters of nitroacetic acid*

The following procedure was employed for the preparation of methyl, isopropyl, n-hexyl, and cyclohexyl esters of nitroacetic acid.

One mole of alcohol was introduced slowly into 0.38 mole of concentrated sulfuric acid with cooling. Nitroacetic acid (0.25 mole) was then added at between zero and five degrees centigrade and the mixture stirred until solution was obtained. The solution was then allowed to stand at room temperature for from 20 to 40 hours, at the end of which time it was diluted with ice and ice-water. Water was separated and the organic layer diluted with two volumes of ether, after which the ether solution was washed three times with water and dried over magnesium sulfate. After filtration and concentration, the remaining oil was treated in either of the following two ways, depending upon the structure and water solubility of the alcohol used in the esterification.

The methyl and isopropyl esters of nitroacetic acid were subjected to one distillation which yielded the essentially pure ester.

The n-hexyl, cyclohexyl, and benzyl esters were found to form sodium salts which were relatively insoluble in water, insoluble in acetone and ether, and very soluble in alcohol. This was advantageous, inasmuch as the corresponding alcohols appear to have a low water-solubility and are not easily removed from the ester product. The sodium salts were isolated and purified in the following manner:

After the removal of as much alcohol as possible by distillation, the crude ester was treated, slowly, with stirring and cooling in an ice bath, with between about 100 and 150 milliliters of 10 per cent aqueous sodium hydroxide solution. The sodium salt which precipitated was filtered and washed twice with about fifteen milliliters of ice-water and then with acetone. The salt was dried, weighed, and treated with two equivalents of hydrochloric acid in about 100 milliliters of water. The reaction was generally found to be slow, and prolonged shaking was usually necessary to completely free the ester. Ether extraction, followed by washing, drying, and concentration of the ether, resulted in the production of a relatively pure ester, as will be apparent from the analysis of benzyl nitroacetate obtained by the above method.

|        | C     | H    | N    |
|--------|-------|------|------|
| Theory | 55.3  | 4.64 | 7.75 |
| Found  | 55.82 | 4.43 | 7.78 |
|        | 55.96 | 4.34 | 7.69 |

In the preparation of the benzyl ester, it was found advantageous to use dry hydrochloric acid gas as a condensing agent, and the procedure employed was as follows:

Benzyl alcohol (127 grams) and 26.3 grams of nitroacetic acid were mixed, and dry HCl gas passed into the mixture with cooling until the solution was saturated at zero degrees centigrade. The solution was allowed to warm to room temperature and was thereafter allowed to stand for two days. Most of the HCl gas, some benzyl chloride, and some alcohol was removed by concentration in vacuo. After dilution with ether, washing with water, drying the ether solution, and concentrating, the ester was treated with sodium hydroxide and worked up as described above.

Properties of some representative esters of nitroacetic acid are as follows:

| Esters | B. P., ° C. | $N_D^{23-28°C.}$ |
|--------|-------------|------------------|
| Methyl | 68.5/5.0 mm | 1.42257 |
| Ethyl | 76/5.0 mm | 1.4210 |
| Isopropyl | 52/0.9 mm | 1.4203 |
| n-Hexyl | | 1.4364 |
| Cyclohexyl | | 1.4640 |
| Benzyl | | 1.5202 |

*Example 2.—Preparation of some esters of alpha-nitro-beta-(3-indole)propionic acid*

The particular nitroacetic acid ester (0.1 mole), gramine (0.1 mole), and 100 milliliters of dry xylene were placed in a three-neck flask of 250 milliliter capacity, which was fitted with a stirrer, nitrogen inlet, thermometer, and condenser. As nitrogen was passed through, the contents of the flask were heated to 90-95 degrees centigrade with efficient stirring. The heating and stirring were continued until evolution of dimethylamine from the reaction ceased, the time required usually being between 3.5 and 5 hours. The xylene was then removed in vacuo, the last traces being removed between about 60-70 degrees centigrade at 0.5 millimeter of mercury pressure.

The crude methyl, ethyl, isopropyl, n-hexyl, cyclohexyl, and benzyl esters of alpha-nitro-beta-(3-indole)-propionic acid produced in this manner were capable of further purification and identification, or could be used directly in the reduction step of the process.

*Example 3.—Reduction of alpha-nitro-beta-(3-indole)propionic acid esters*

The ester (0.01 mole) was dissolved in about 15 milliliters of absolute alcohol and placed in a bomb of 40 milliliters void with about one gram of Raney nickel catalyst. Hydrogen was introduced into the bomb up to a pressure of about 2500 p. s. i., the temperature being raised to 100 degrees centigrade as rapidly as possible with constant rocking of the autoclave. Reduction usually occurred in about 1.5 to 2 hours, after which the bomb was allowed to cool to room temperature, and the catalyst removed by filtration and washed with alcohol. Alcohol was removed by concentration, the crude ester hydrolysed by refluxing for 2 to 4 hours with 15 milliliters of 10 per cent aqueous sodium hydroxide, treated with 250 milligrams of charcoal, filtered, and the solution brought to a pH of about 5.95 with glacial acetic acid. After removal of a small amount of dark brown amorphous material which usually precipitated immediately, the tryptophane came out upon standing overnight in the cold. The tryptophane was then filtered, washed with a little cold water, alcohol, and finally with ether. The product at this point usually had a grayish white appearance and was recrystallised from 33 per cent alcohol according to usual procedure. Melting points and mixed melting points with an authentic sample proved that the product from each of the esters was dl-tryptophane.

| Starting Ester | dl-Tryptophane [1] | |
|---|---|---|
| | M. P., °C. | M. M. P., °C. |
| Methyl | 284 | 285 |
| Isopropyl | 292 | 291 |
| n-Hexyl | 278.5 | 273 |
| Cyclohexyl | 275 | 276 |
| Benzyl | 272 | 271 |

[1] Uncorrected, decomposition. Melting point and mixed melting point taken together.

*Example 4.—Ethyl alpha-nitro-beta-(3-indole)-propionate*

Gramine, 3-dimethylaminomethylindole (8.66 grams), 13.3 grams of ethyl nitroacetate and 50 milliliters of dry xylene were introduced into a 250-milliliter, three-neck flask fitted with stirrer, thermometer, nitrogen inlet and condenser. The temperature of the mixture was then raised to between about 90 and 100 degrees centigrade and maintained at this level for about 5 hours while passing a slow stream of nitrogen through the vigorously stirred mixture. During this time about one-half of the theoretical amount of dimethylamine was evolved, whereafter the hot solution was filtered from a small amount of crystalline solid and the xylene removed by concentration in vacuo. The residual gum was dissolved in chloroform and the resulting solution extracted twice with 50-milliliter portions of 10 per cent HCl and washed with water until neutral. The chloroform solution was dried over $MgSO_4$ and concentrated in vacuo, whereafter excess ethyl nitroacetate was distilled off under reduced pressure, 2.9 grams coming over at 64 degrees centigrade under 3 millimeters of mercury pressure. The residue was dissolved in chloroform and extracted to exhaustion with a 5 per cent aqueous solution of sodium hydroxide. The aqueous alkaline extract was then acidified with 10 per cent HCl and extracted with chloroform; the extract was dried and concentrated and crystallisation of the remaining oil allowed to occur. The yield of ethyl alpha-nitro-beta-(3-indole)propionate was 11.8 grams or 90 per cent of theory. The melting point was 60.0 to 62.1 degrees centigrade.

An analytical sample, recrystallised four times from a benzene-petroleum ether mixture, melted at 62.0 to 62.8 degrees centigrade (uncorrected) and analysed as follows:

| | C | H | N |
|---|---|---|---|
| Theory | 59.69 | 5.38 | 10.69 |
| Found | 59.65 | 5.46 | 10.78 |
| | 59.62 | 5.24 | 10.57 |

*Example 5.—Preparation of tryptophane*

Ethyl alpha-nitro-beta-(3-indole)propionate (2.62 grams), 15 milliliters of absolute ethanol and about one-half gram of Raney nickel catalyst were placed in a bomb of 40 milliliters capacity. The reduction was carried out at 100 degrees centigrade and with an original hydrogen pressure of 1500 p. s. i. at 25 degrees centigrade. The theoretical amount of hydrogen was absorbed during a 12-hour period. After filtering off catalyst, the alcohol was removed by concentration under vacuum. The light colored oil which remained was heated under reflux with 16 milliliters of 10 per cent aqueous sodium hydroxide for two hours. After treating with activated charcoal (Darco G-60) and filtering, the pH of the solution was adjusted to 5.9 with glacial acetic acid. Crystals appeared, the flask was cooled in the icebox for a period of 15 hours, whereafter tryptophane was filtered off and washed with a small quantity of cold water. The wet cake was dissolved in 100 milliliters of 33 per cent alcohol, treated with an additional quantity of Darco G-60, filtered hot and allowed to cool slowly with rubbing. The tryptophane crystallised out in glistening plates, was filtered and washed with alcohol and with ether. The crystals were then dried in a vacuum.

An analytical sample was prepared by recrystallising 4 times from 33 per cent alcohol. The sample melted at 278.0 to 280.0 degrees centigrade and analysed as follows:

| | C | H |
|---|---|---|
| Theory | 64.69 | 5.92 |
| Found | 64.50 | 6.06 |
| | 64.65 | 5.92 |

The mixed melting point with an authentic dl-tryptophane was 278.0-280.0 degrees centigrade (uncorrected) (decomposition).

Example 6.—Preparation of tryptophane

The reduction can also be carried out chemically as follows: Ethyl alpha-nitro-beta-(3-indole)propionate (2.62 grams), 3.5 grams of powdered iron (or iron filings), 7.5 milliliters of water, 7.5 milliliters of alcohol and 10 milliliters of concentrated hydrochloric acid were placed in a 250-milliliter flask, stirred vigorously for 15 minutes and then heated, with stirring, to boiling over a period of about 15 minutes. The reaction mixture was refluxed for 15 minutes, cooled to room temperature, made alkaline with 10 per cent aqueous sodium hydroxide, filtered and washed with water. The clear alkaline solution was brought to a pH of 6.0 with concentrated sulfuric acid. After seeding and rubbing, crystallisation began. When crystallisation was complete the product was filtered and recrystallised from 33 per cent alcohol, whereafter the dl-tryptophane melted at 283-4 degrees centigrade (uncorrected) (decomposed). A mixed melting point with an authentic dl-tryptophane was 283-283.5 degrees centigrade (decomposition) (uncorrected).

Example 7.—Condensation of nitroacetic acid esters with aldehydes

Ethyl nitroacetate (0.3 mole) and isobutyraldehyde (0.3 mole) were mixed thoroughly and cooled to zero degrees centigrade. Piperidine (1.5 grams) was added slowly and with stirring, whereafter the reaction flask was maintained at ice-temperature for two days. After dilution of the reaction product with 150 milliliters of benzene, it was washed with 200 milliliters of dilute hydrochloric acid and then twice with 200-milliliter portions of water. The benzene solution was dried over magnesium sulfate and concentrated in vacuum to a quantity of 54.6 grams. This residual liquid was distilled in a vacuum using a magnetic stirrer in the distillation flask, which speeded the distillation and allowed a lower bath temperature. Four cuts were made, the main fraction being the third, which boiled from 69 degrees centigrade at 0.35 millimeter to 82 degrees centigrade at 0.32 millimeter of mercury pressure. The weight of this cut was 28.53 grams, a yield of 46.3 per cent of theory. The refractive index of the cut at 27 degrees centigrade was 1.4442. The fraction was redistilled and four cuts made to obtain an analytical sample. The fourth cut analysed as follows:

|  | C | H | N |
|---|---|---|---|
| Theory for ethyl alpha-nitro-beta-hydroxy-isocaproate | 46.82 | 7.37 | 6.83 |
| Found | 46.88 | 7.34 | 6.78 |

This compound, ethyl alpha-nitro-beta-hydroxyisocaproate, is the intermediate for leucine.

In a similar manner, acetaldehyde is condensed with a nitroacetate to yield the threonine intermediates, esters of alpha-nitro-beta-hydroxy-n-butyric acid.

Reference is made to our copending application Serial No. 733,982, filed March 11, 1947, now Patent No. 2,557,041, in which is claimed subject matter disclosed or originally included but not claimed herein.

Inasmuch as various modifications may be made in carrying out the method of the invention without departing from the spirit or scope thereof, it is to be understood that we limit ourselves only as defined by the appended claims.

We claim:

1. A process for the production of threonine, which comprises the condensation of a monoalkyl ester of nitroacetic acid with acetaldehyde to produce an ester of alpha-nitro-beta-hydroxy-n-butyric acid, reducing the said ester with hydrogen and a hydrogenation catalyst to produce the corresponding aminoacetic acid ester, hydrolyzing the said ester with an aqueous alkaline hydrolyzing agent, and recovering threonine from the resulting hydrolysis products.

2. A process for the production of leucine which comprises the condensation of a monoalkyl ester of nitroacetic acid with isobutyraldehyde to produce an ester of alpha-nitro-gamma-methylpentene-2-oic acid, reducing the said ester with hydrogen and a hydrogenation catalyst to produce the corresponding amino acid ester, hydrolyzing the said ester with an aqueous alkaline hydrolyzing agent and recovering leucine from the resulting hydrolysis products.

3. A process for the production of an alpha-substituted aminoacetic acid, which comprises: a Knoevenagel-type condensation of a monoalkyl ester of a nitroacetic acid with an aliphatic aldehyde selected from the group consisting of acetaldehyde and isobutyraldehyde to form a monoalkyl ester of an alpha-(aliphatic-substituted)-nitroacetic acid, reducing the nitro group of said ester with hydrogen and a hydrogenation catalyst to produce the corresponding monoalkyl aminoacetic acid ester, hydrolyzing the said ester with an aqueous alkaline hydrolyzing agent, and recovering the alpha-substituted aminoacetic acid from the resulting hydrolysis products.

DAVID I. WEISBLAT.
DOUGLAS A. LYTTLE.

REFERENCES CITED

The following references are of record in the file of this patent:

UNITED STATES PATENTS

| Number | Name | Date |
|---|---|---|
| 2,005,538 | Engelmann | June 18, 1935 |
| 2,071,327 | Biey | Feb. 23, 1937 |
| 2,152,852 | Loder | Apr. 4, 1939 |
| 2,301,829 | Studer | Nov. 10, 1942 |
| 2,334,163 | Kirk | Nov. 16, 1943 |
| 2,380,479 | Stiller | July 31, 1945 |

OTHER REFERENCES

Bouveault: Bull. Soc. Chim. de Paris, 3rd series, vol. 25 (1901), pp. 911–914.

Wahl: Bull. Soc. Chim. de Paris, 3rd series, vol. 25 (1901) pp. 918–929.

Jackson: J. Am. Chem. Soc., vol. 52 (1930) pp. 5029–5035.

Beilstein, 4th ed., 2nd suppl., vol. 2 (1942); p. 234, citing: Steinkopf, Annalen, vol. 434, p. 29.

Albertson: J. Am. Chem. Soc., vol. 67 (1945), pp. 36–37.

Lynn: Organic Chem. (Lea and Febiger, 3rd ed.), 37, 195 (1948).